May 5, 1964 C. V. MILLER ETAL 3,131,867
ROTARY POP-UP SPRINKLER
Filed May 31, 1963 3 Sheets-Sheet 1

CECIL V. MILLER
RAY M. WHITSON
INVENTORS.

BY Huebner & Worrel
ATTORNEYS.

CECIL V. MILLER
RAY M. WHITSON
INVENTORS.

BY Huebner & Worrel
ATTORNEYS.

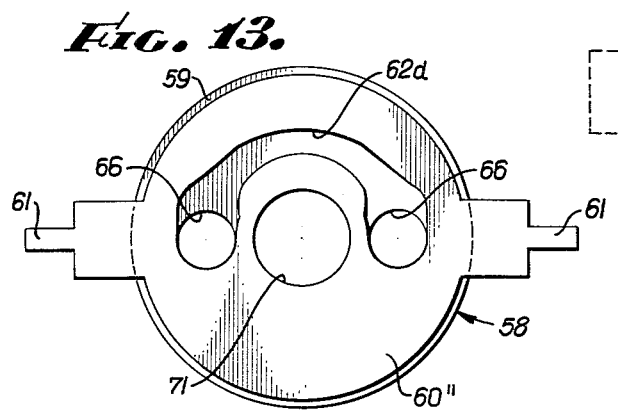
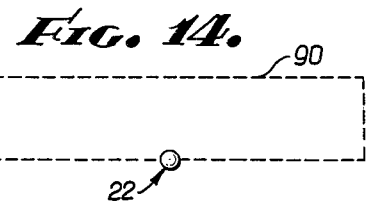
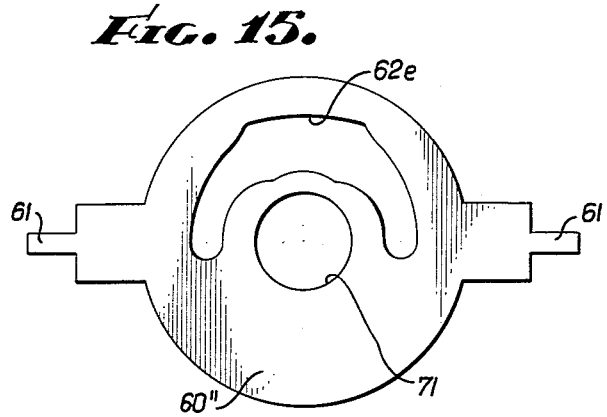
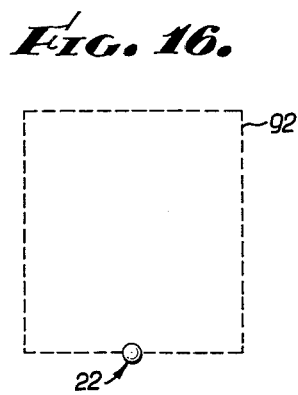
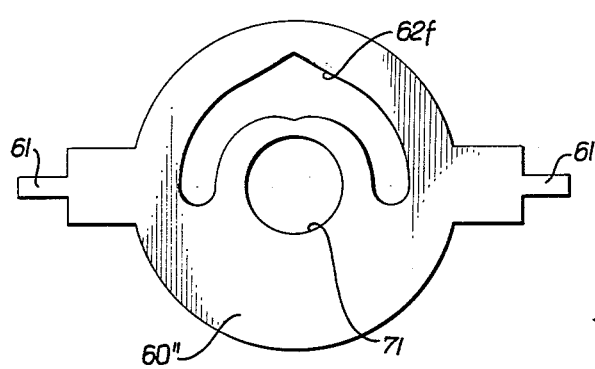
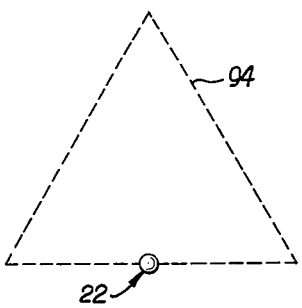

United States Patent Office 3,131,867
Patented May 5, 1964

3,131,867
ROTARY POP-UP SPRINKLER
Cecil V. Miller, 9243 Larosa Drive, Temple City, Calif., and Ray M. Whitson, 1123 Sandia, La Puente, Calif., assignors of one-third to J. C. Nees and Betty Nees, Arcadia, Calif.
Filed May 31, 1963, Ser. No. 284,736
15 Claims. (Cl. 239—97)

This invention relates to a rotary pop-up sprinkler and more particularly to a sprinkler mounted below ground level which has a nozzle portion that may, by water pressure, be elevated above the ground level when in operation and will rotate and water a predetermined area.

The invention relates to a pop-up sprinkler wherein the nozzle portion is rotated by fluid action drive means which is rotated by water obliquely striking said drive means, and a water passage through a rigid diaphragm means which regulates the amount and direction of water ejected from the nozzle.

An object of this invention is to provide a rotary pop-up sprinkler where the sprinkler will spray an area of predetermined shape smoothly and evenly without interruption.

Another object of this invention is to provide a rotary pop-up sprinkler having internal working parts which cannot be damaged by forcibly interfering with the rotation of the head portion.

A further object of this invention is to provide a pop-up sprinkler that may be fitted with diaphragm means having different sizes and shapes of water passages which control the flow and direction of water to achieve different patterns of water spray.

These and other objects of the invention will be made more fully apparent from a consideration of the description which follows taken in conjunction with the drawings.

Figure 1:
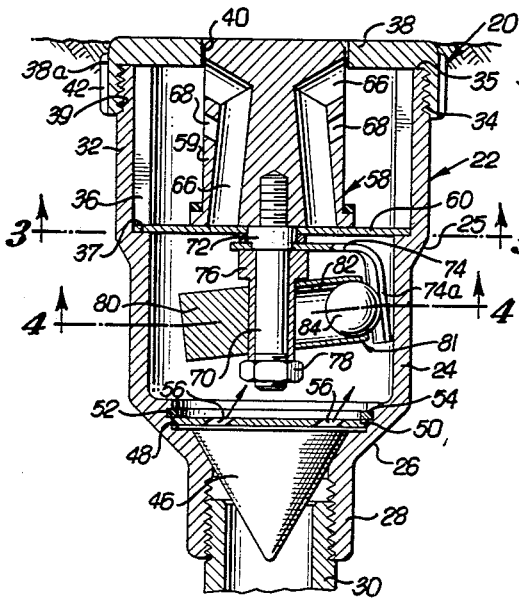
Figure 2:
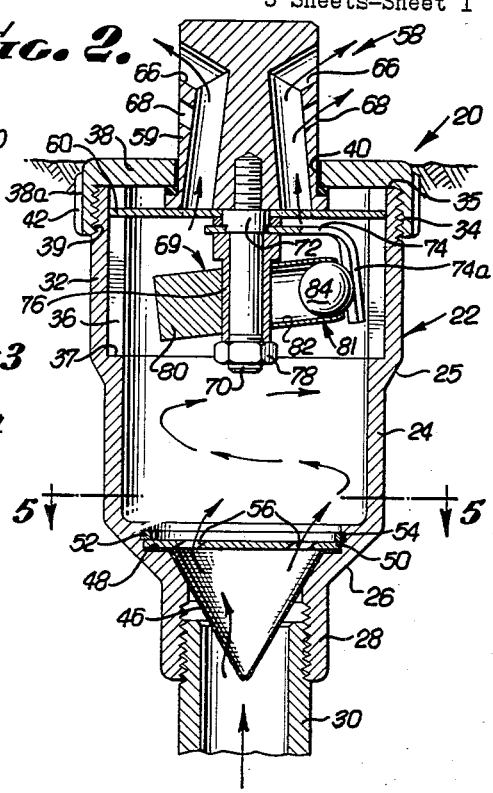
Figure 3:
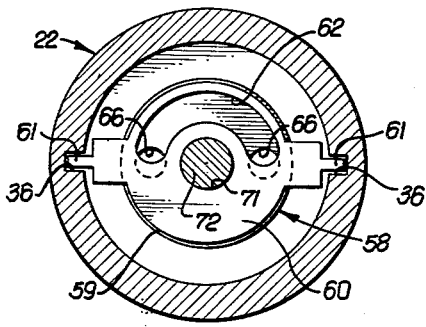
Figure 4:
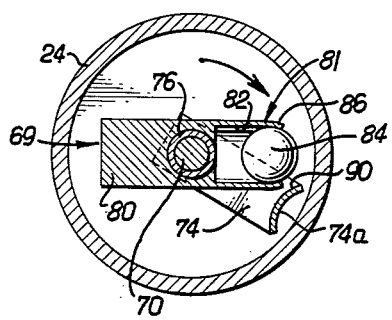
Figure 5:
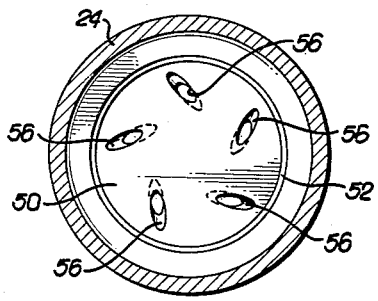
Figure 6:
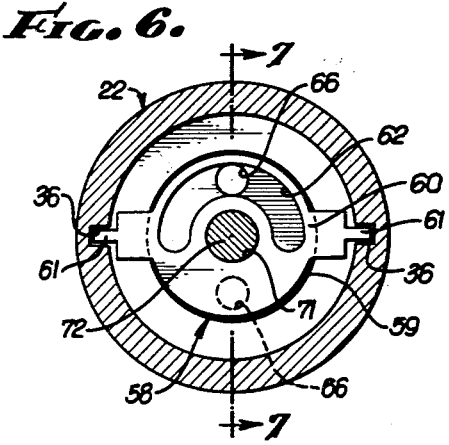
Figure 7:
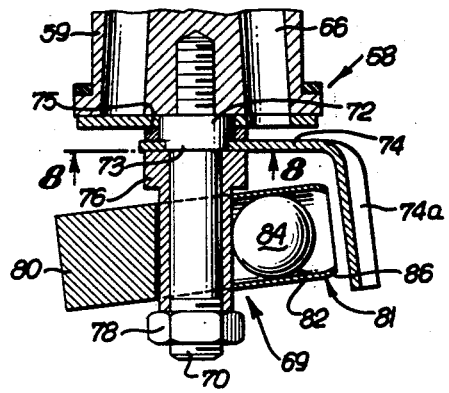
Figure 8:
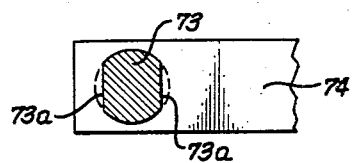

In the drawings:
FIGURE 1 is a side elevational sectional view of the rotary pop-up sprinkler in an at rest position;
FIGURE 2 is a side elevational cross sectional view similar to FIGURE 1 wherein the sprinkler head or nozzle is raised above the sprinkler in operating position;
FIGURE 3 is a cross sectional view taken on line 3—3 of FIGURE 1;
FIGURE 4 is a cross sectional view taken on line 4—4 of FIGURE 1 showing in detail the fluid actuated drive means;
FIGURE 5 is a view taken on line 5—5 of FIGURE 2;
FIGURE 6 is a cross sectional view similar to FIGURE 3 but with the sprinkler head rotated 90°.
FIGURE 7 is a detailed sectional view of a portion of the sprinkler head and fluid actuated drive means taken on line 7—7 of FIGURE 6;
FIGURE 8 is a view partly in section taken on line 8—8 of FIGURE 7;
FIGURES 9, 10, 11 and 12 are cross sectional views similar to FIGURE 3 illustrating modified diaphragm means which may be utilized to obtain a radial stream of water from the sprinkler of a 360°, 90°, 120° or 270° arc, respectively;
FIGURES 13, 15 and 17 are further modifications of diaphragm means which may be used to obtain rectangular, square or diamond shaped patterns of water spray, respectively; and
FIGURES 14, 16 and 18 are schematic views of the pattern shapes that can be achieved by use of the means illustrated in FIGURES 13, 15 and 17.

In general, a rotary pop-up sprinkler designated 20 is mounted below the ground where it is desired to water grass or other growth by aerial watering such as may be found on golf courses, yards, parks, etc.

The sprinkler 20 comprises an elongated circular housing designated 22 having a central portion 24, an inwardly tapering annular shoulder 26 extending from the portion 24 and an internally threaded collar 28 formed on the shoulder 26. Rising from the central portion 24 is a slightly outwardly tapered annular shoulder 25 and extending upwardly therefrom is an upper straight sided portion 32 having external threads 34 at the top 35. The upper portion 32 of the housing 22 is formed with a pair of diametrically opposed internal longitudinal guide grooves 36 extending from the top 35 of the housing 22 and terminating forming internal shoulders 37 adjacent the central portion 24.

A circular cap 38 formed with internal threads 39 is threadably secured on threads 34 at the top of the housing 22. Additionally, there is formed in the cap 38 a centrally located opening 40. On the side exterior 38a of the cap a plurality of outwardly projecting ribs 42 are formed to be utilized with a wrench for removing the cap to gain access into the housing 22.

The housing 22 is secured by threaded collar 28 onto a normal water pipe riser 30 such as is illustrated in FIGURES 1 and 2 whereby the top of the cap 38 will normally be flush with the ground surface.

An annular internal shoulder 48 is provided on the interior of the housing at the tapered shoulder 26. Upon this shoulder 48 there is seated a conical screen filter 46 which projects into the riser 30. The primary function is to filter and screen foreign matter from the water as it comes through the riser 30. Also, the shape of the screen will not allow foreign matter to congregate on the screen but be forced to the side so water flow will be unimpaired. Mounted on top of the conical screen 46 is a directional flow means or circular flow direction plate 50 and a snap ring 52 is inserted in an annular groove 52 to hold the directional means 50 and conical screen 46 in place. The means 50 is provided with a plurality of jet water passages 56 as best seen in FIGURE 5. These jet water passages are normally angled from the vertical to allow water flowing into the housing 22 to enter on an angular and spiral path, such as is seen by the dotted lines in FIGURE 2. The flow of water into the housing will be at an oblique angle from the riser 30 caused by the angle of the openings 56. The reasons for such oblique spiral path of water will be subsequently explained.

Within the housing 22 there is provided a rotary sprinkler head or nozzle generally designated 58. The sprinkler head means 58 normally assumes an at rest position such as is seen in FIGURE 1 where the entire mechanism is within the housing 22. However, when water is released into the housing 22, the hydrostatic pressure wil raise the sprinkler head means 58 so that the nozzle 59 will protrude out of the housing such as is seen in FIGURE 2. The details of construction will be subsequently described.

The rotary sprinkler head means 58 includes a rigid diaphragm means 60 of a relatively flat plate having end extensions 61 adapted to be slidably mounted within the respective grooves 36. The diaphragm means 60 illustrated in FIGURES 1 and 6 is additionally formed with a water passage or arcuate slot 62 of approximately 180°. The slot 62 is of a uniform width. Resting and rotatively bearing upon the diaphragm means 60 is the circular nozzle 59. The nozzle 59 illustrated in FIGURES 1, 2 and 7 is rotatably mounted on the diaphragm and is formed with a pair of diametrically opposite passageways or ports 66 extending from the bottom of the nozzle upwardly on inwardly inclined planes from the vertical to a point where they project from the inclined planes laterally outwardly to the exterior of the head 59. Additionally, there is provided a pair of smaller sized or minor lateral passageways 68 which extend outwardly from the passage 66 below the upper larger lateral portion. The ports 66 are formed so that they may be in intermittent registry with the slot 62 as the nozzle is rotated. Further, in the embodiment illustrated in FIGURES 3, 6 and 9 through 12, the width of the slot 62 corresponds with the diameter of the port.

Suspended below the diaphragm means 60 is a fluid actuated drive means generally designated 69. This assembly 69 is mounted upon a stud bolt 70 which is secured in and projects downwardly from the nozzle 59 through an opening 71 in the diaphragm means 60.

The bolt 70 includes an enlarged bearing collar 72 within the opening 71 of the diaphragm. Further, beneath the collar 72 a locking or keying collar 73, as best seen in FIGURE 8, is formed with oppositely flattened sides 73a.

The drive means 69 includes a rotatable striker member 74 which will be locked or keyed to the bolt 70 on the collar 73. The striker 74 includes a down-turned finger portion 74a. A washer 75 is positioned between the striker 74 and the diaphragm 60. Below the striker 74 a rotatable drive arm sleeve 76 is mounted for free rotation on the bolt 70. A nut 78 is threadably secured to the bolt 70 at the bottom to hold the above described striker and sleeve in position. In this construction, the nozzle 59 and striker 74 will rotate together, and the sleeve 76 will be free to rotate independently of the head and finger.

The sleeve 76 is formed with an elongated cylindrical drive arm or impeller 80 which is slightly inclined from the horizontal, as best seen in FIGURES 1, 2 and 7, and has a ball race 81 including a bore 82 in the elevated front portion thereof. Mounted within the bore 82 is a weight or ball 84 which is freely movable up and down within the bore 82 but is retained from falling out of the bore by means of the crimped end 86. The crimping is just enough to allow the ball 84 to extend part way out of the bore, as seen in FIGURES 1 and 2, so that it may contact the striker finger on its arcuate interior surface 90 as best seen in FIGURE 4.

In operation, water flowing through the riser pipe 30 and conical screen 46 is emitted through jets 56 into the interior of the housing 22 in a circular swirling pattern, and as the water within the housing rises, the sprinkler means 58 and drive means 69 will be forced upwardly to the point, as seen in FIGURE 2, where the nozzle 59 will pop-up and project above the ground level. The entire assembly is guided upwardly by the extensions 61 riding in the grooves 36. It has been found that normally a water line pressure of approximately five pounds per square inch is sufficient to raise the sprinkler head to the position as seen in FIGURE 2. As the water line pressure builds up, more force is exerted in this circular pattern against the vane 80 of the fluid actuated means 69 causing this assembly to rotate. By centrifugal force, the ball 84 will be urged from its normal at rest position in the ball race 82, as best seen in FIGURE 7, to an extended position, as best seen in FIGURES 1 and 2, so that the ball will strike and engage the arcuate interior surface 90 of the striker finger 74a imparting rotation thereto. As the striker 74 is keyed to the nozzle 59, it will rotate with the striker.

An advantage of such construction is that should rotation of the nozzle 59 be interfered with, such as holding the nozzle, the drive means 69 cannot be damaged because of this ball and ball race construction, and once the interference has been eliminated, rotation will be immediately resumed. Thus it can be seen that the life expectancy of such a sprinkler will be greatly increased.

When the water is turned off, the rotation of the drive means 69 will be reduced and the ball 84 will gravitationally roll out of contact with the striker finger 74a.

As water is forced through the slot 62 of the diaphragm 60 and the nozzle 59 rotates, the passageways or ports 66 will register with the slot 62 for an arc of rotation allowing water which has built up within the housing 22 to be forced through the ports 66 and out the nozzle 59. It will be noted that in the embodiment of the invention as shown in FIGURES 3 and 6 the slot 62 extends for approximately 180° around the diaphragm 60 so that a full stream of water will only be allowed in one passageway at a time because the passageways are spaced 180° apart. This embodiment would be used when it is desired to have a 180° spray of water from the head. By this valve action, water will only be allowed to pass out one of the ports 66 for one-half of the revolution of the nozzle 59, or 180°. Water passing out the lateral port 68 will spray from the nozzle approximately the first half of the distance of the pattern and the larger lateral port 66 will spray the remaining area of the pattern.

Figure 9:
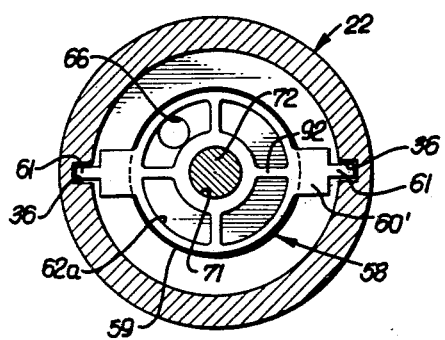
Figure 10:
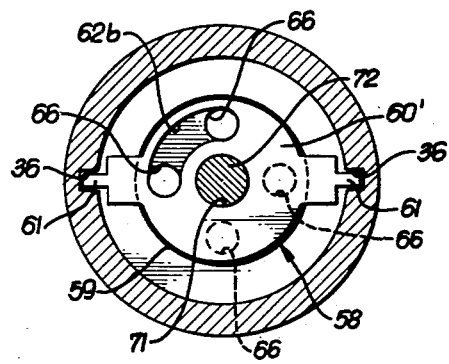

Various arcs and lengths of slots may be formed in the diaphragm 60 so that the water forced from the nozzle 59 may be directed in a predetermined pattern for a coverage of a specific area. Such is illustrated in the embodiments of FIGURES 9 through 12.

Where it is desired to have a complete 360° coverage, only one port or passageway 66 is necessary and a complete 360° slot 62a may be provided in the plate 60' such as is seen in FIGURE 9. In such a case, it is necessary, however, to provide structural support spokes 92, but the spokes are of such a small thickness that the flow of water will not be interrupted when full water pressure is built up within the pipes.

When it is desired that a spray or pattern of 90° be used, the diaphragm 60' is provided with a 90° slot 62b. Additionally, it is necessary to provide four passageways 66 within the nozzle 59 so that there will be a continuous flow of water in the 90° arc; in other words, two passageways can be in registry with the slot 62b at a time, but the area covered by the water will be limited to the predetermined 90° arc of the slot.

Figure 11:
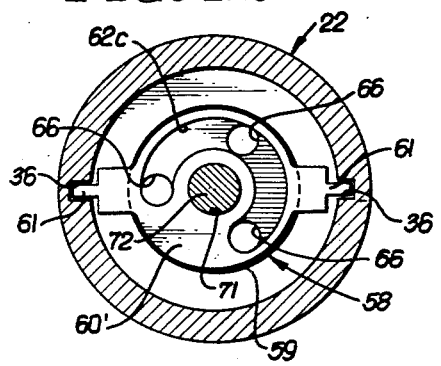
Figure 12:
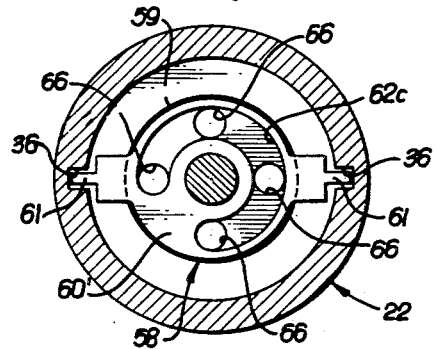

In FIGURES 11 and 12, additional modifications are shown for sprinkling in a pattern of a 120° and 270° arc. In FIGURE 11, there are three passageways 66 and a slot 62c of 270°. In FIGURE 12, where the slot 62c extends for 270° as in FIGURE 11, there is an additional passageway 66 making four in all. This will insure a pattern of 270° as the nozzle 59 is rotated upon the diaphragm 60'.

The diaphragm means 60 are interchangeable, so by knowing the area to be watered by the sprinkler, the correct diaphragm means 60 or 60' can be inserted within the housing 22.

In FIGURES 13, 15 and 16, additional modified diaphragm means 60'' are illustrated. The diaphragm 60'' has an exterior construction coincident with the diaphragm 60; however, the slots differ in configuration. In all cases, the grooves 62d, 62e and 62f shown in FIGURES 13, 15 and 17, respectively, have an arc of 180°. The width of the respective grooves varies dependent upon the desired pattern.

Each of the slots, due to the varying widths, will cause the water to be discharged in a radial pattern of predetermined configuration such as a rectangle 90, a square 92 and a triangle 94, illustrated by dotted lines in FIGURES 14, 16 and 18, respectively.

It can be seen that with the varying of the slot widths either larger or smaller than the diameter of the ports 66, more or less water may be discharged to conform with the predetermined pattern.

The other modified slots 62e and 62f operate similarly to the slot 62d.

It should be noted that only a few modified plates have been illustrated and described; however, other variations of slot designs may be provided to create any desired pattern of water coverage and the invention is not restricted to these specific embodiments.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent devices.

We claim:

1. A pop-up sprinkler comprising a generally vertical housing embodying means at its lower end for attachment to a water supply element and having an opening at its upper end, a nozzle disposed within said housing when the sprinkler is inoperative and slidable through said opening to an elevated position when the sprinkler is operating, rigid diaphragm means nonrotatably but vertically slidably mounted within said housing and supporting said nozzle for rotation of said nozzle on said means, a fluid actuated drive means disposed in said housing below said diaphragm and operably connected with said nozzle through said diaphragm, directional flow means in the lower portion of said housing below said fluid actuated drive means whereby water under pressure introduced through said directional flow means will obliquely strike said drive means causing the same to rotate and in turn to rotate the nozzle, the force of said water acting upon the lower surface of the diaphgram and elevating the same to project the nozzle vertically from the housing, and the diaphragm having a water passage therethrough communicating between the housing below the diaphragm and a port in the nozzle whereby water will flow through said port and be disbursed by said nozzle.

2. A pop-up sprinkler as defined in claim 1 wherein the water passage through said rigid diaphragm means is generally an elongated arcuate slot circumferentially interrupted by a wall of the diaphragm whereby the angular restriction of water disbursed from said nozzle is determined.

3. A pop-up sprinkler as defined in claim 2 wherein the width of the generally elongated arcuate slot of said rigid diaphragm means may be varied whereby a volume of water which can flow through said diaphragm and be disbursed through said nozzle varies at different arcuate locations to further regulate a spray pattern of said nozzle.

4. A pop-up sprinkler as defined in claim 3 wherein the rigid diaphragm is interchangeable in the housing with a diaphragm means having a water passage of different configuration.

5. A pop-up sprinkler as defined in claim 1 wherein the rigid diaphragm means is a generally flat plate including a pair of radially extending guide arms which engage said housing.

6. A pop-up sprinkler comprising a generally vertical housing embodying means at its lower end for normally permanent attachment to a water supply element and having an opening at its upper end, said housing being adapted to be mounted below the ground, a nozzle disposed within said housing when the sprinkler is inoperative and slidable through said opening to an elevated position above the ground when the sprinkler is operating, rigid diaphragm means nonrotatably but vertically slidably mounted within said housing and supporting said nozzle for rotation of said nozzle on said means, a fluid actuated drive means disposed in said housing below said diaphram and operably connected with said nozzle through said diaphragm, directional flow means in the lower portion of said housing below said fluid actuated drive means whereby water under pressure introduced through said directional flow means will obliquely strike said drive menas causing the same to rotate and in turn to rotate the nozzle, the force of said water acting upon the lower surface of the diaphragm and elevating the same to project the nozzle vertically from the housing, and the diaphragm having a water passage therethrough communicating between the housing below the diaphragm and a port in the nozzle whereby water will flow through said port and be disbursed by said nozzle.

7. A pop-up sprinkler as defined in claim 1 wherein said fluid drive means comprises a shaft interlocked with said nozzle, a striker member also interlocked with said nozzle and an impeller member freely rotatable on the shaft disengageably engageable with said striker member dependent upon the oblique water pressure applied thereto.

8. A pop-up sprinkler as defined in claim 6 wherein said impeller member comprises a vane rotatably actuated by the said water, and weighted means diametrically opposite said vane advanceable by centrifugal force into driving engagement with said striker member.

9. A pop-up sprinkler as defined in claim 8 wherein said weighted means includes a ball race inclined upwardly from the axis of said shaft and a ball movable therealong whereby in the absence of sufficient centrifugal force to effect the drivable engagement of said ball with said striker member said ball will return by gravity out of contact with the striker member.

10. A pop-up sprinkler comprising a generally vertical housing embodying means at its lower end for attachment to a water supply element and having an opening at its upper end, a nozzle disposed within said housing when the sprinkler is inoperative and slidable through said opening to an elevated position when the sprinkler is operating, a rigid generally flat plate diaphragm having a pair of radially extending guide arms engaging said housing nonrotatably but vertically slidably mounted within said housing and supporting said nozzle for rotation of said nozzle on said means, a fluid actuated drive means disposed in said housing below said diaphragm and operably connected with said nozzle through said diaphragm, directional flow means in the lower portion of said housing below said fluid actuated drive means whereby water under pressure introduced through said directional flow means will obliquely strike said drive means causing the same to rotate and in turn to rotate the nozzle, the force of said water acting upon the lower surface of the diaphragm and elevating the same to project the nozzle vertically from the housing, and the diaphragm having a generally elongated arcuate slot circumferentially interrupted by a wall of the diaphragm communicating between the housing below the diaphragm and a port in the nozzle whereby the angular restriction of water through said port and said nozzle is determined.

11. A pop-up sprinkler as defined in claim 1 wherein the nozzle is perforate along its longitudinal axis and includes at least one port having a portion of said port disposed generally longitudinally adjacent the axis and a second portion of said port extending generally laterally therefrom forming an ejection orifice.

12. A pop-up sprinkler as defined in claim 11 wherein said nozzle includes a plurality of ports and ejection orifices.

13. A pop-up sprinkler as defined in claim 11 wherein said port includes a third portion disposed below and on a plane with said second portion forming an additional ejection orifice.

14. A pop-up sprinkler comprising a generally vertical housing embodying means at its lower end for attachment to a water supply element and having an opening at its upper end, a nozzle disposed within said housing when the sprinkler is inoperative and slidable through said opening to an elevated position when the sprinkler is operating, rigid diaphragm means nonrotatably but vertically slidably mounted within said housing and supporting said nozzle for rotation of said nozzle on said means, a fluid actuated drive means disposed in said housing below said diaphragm and operably connected with said nozzle through said diaphragm, directional flow means in the lower portion of said housing below said fluid actuated drive means, said directional flow means including a plate disposed normal to the flow of water and having a plurality of jets angularly disposed from the plane of said plate whereby water under pressure introduced through said jets will obliquely strike said drive means causing the same to rotate and in turn to rotate the nozzle, the force of said water acting upon the lower surface of the diaphragm and elevating the same to project the nozzle vertically from the housing, and the diaphragm having a water passage therethrough communicating between the housing below the diaphragm and a port in the nozzle whereby water will flow through said port and be disbursed by said nozzle.

15. A pop-up sprinkler comprising a generally vertical housing embodying means at its lower end for normally permanent attachment to a water supply element and having an opening at its upper end, said housing being adapted to be mounted below the ground, a nozzle disposed within said housing when the sprinkler is inoperative and slidable through said opening to an elevated position above ground when the sprinkler is operating, rigid diaphragm means nonrotatably but vertically slidably mounted within said housing and supporting said nozzle for rotation of said nozzle on said means, a fluid actuated drive means including a shaft interlocked with said nozzle, a striker member also interlocked with said nozzle and an impeller member freely rotatable on the shaft disengageably engageable with said striker member, all disposed in said housing below said diaphragm and operably connected with said nozzle through said diaphragm, directional flow means in the lower portion of said housing below said fluid actuated drive means whereby water under pressure introduced through said directional flow means will obliquely strike said impeller member causing the same to rotate and in turn to rotate said striker member and said nozzle, the force of said water acting upon the lower surface of the diaphragm and elevating the same to project the nozzle vertically from the housing, and the diaphragm having a generally elongated arcuate slot therethrough circumferentially interrupted by a wall of the diaphragm and communicating between the housing below the diaphragm and a port in the nozzle whereby water will flow through said port and be disbursed by said nozzle.

References Cited in the file of this patent
UNITED STATES PATENTS

| | | |
|---|---|---|
| 1,864,892 | Coles et al. | June 28, 1932 |
| 2,009,478 | Coles et al. | July 30, 1935 |
| 2,081,510 | Smart | May 25, 1937 |
| 2,268,855 | Brooks | Jan. 6, 1942 |
| 2,414,052 | Martin | Jan. 7, 1947 |
| 2,990,120 | Reynolds | June 27, 1961 |